HENRI F. P. LeTILLY
LOUIS MICHEL
INVENTORS

Karl G. Ross
AGENT

April 5, 1966  H. F. P. LE TILLY ETAL  3,245,076
AUTOMATIC PILOTAGE SYSTEM FOR AN AIRCRAFT OR MISSILE
Filed May 14, 1963  5 Sheets-Sheet 2

HENRI F. P. LeTILLY
LOUIS MICHEL
INVENTORS

Karl J. Ross
AGENT

April 5, 1966  H. F. P. LE TILLY ETAL  3,245,076
AUTOMATIC PILOTAGE SYSTEM FOR AN AIRCRAFT OR MISSILE
Filed May 14, 1963  5 Sheets-Sheet 3

INVENTORS: HENRI F. P. LeTILLY
LOUIS MICHEL

Karl G. Ross
AGENT

April 5, 1966    H. F. P. LE TILLY ETAL    3,245,076
AUTOMATIC PILOTAGE SYSTEM FOR AN AIRCRAFT OR MISSILE
Filed May 14, 1963    5 Sheets-Sheet 4

INVENTORS: HENRI F. P. LeTILLY
LOUIS MICHEL

Karl G. Ross
AGENT

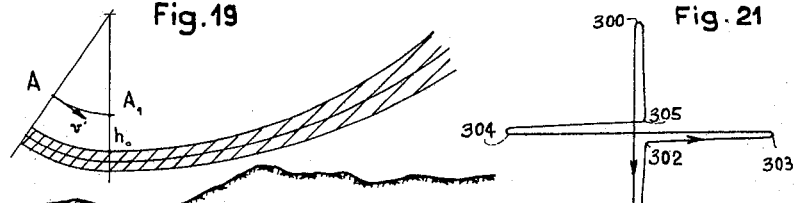
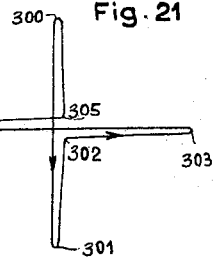
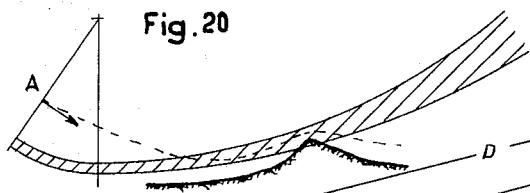
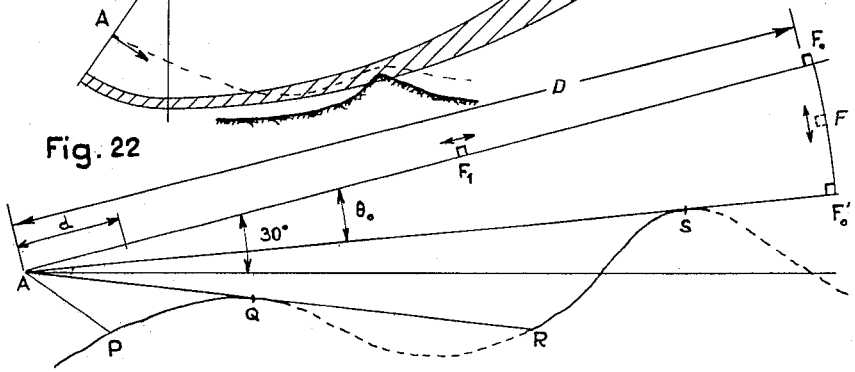
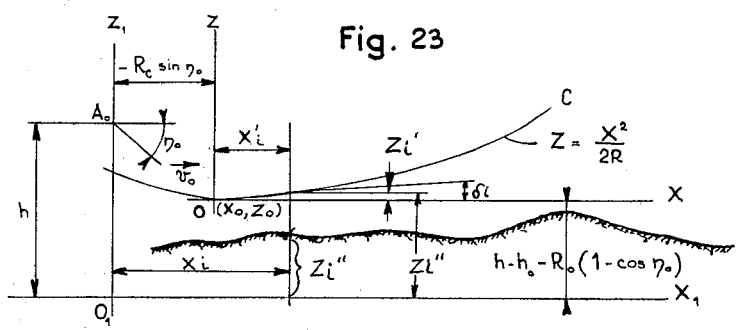
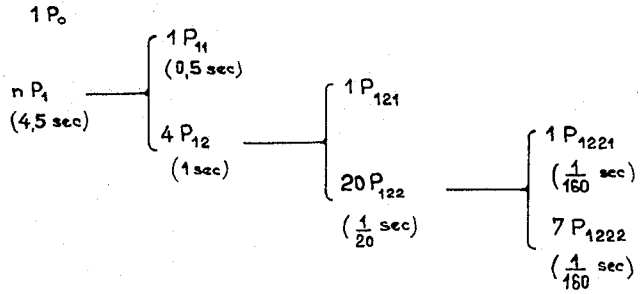

2

United States Patent Office 3,245,076
Patented Apr. 5, 1966

3,245,076
AUTOMATIC PILOTAGE SYSTEM FOR AN
AIRCRAFT OR MISSILE
Henri François Pierre Le Tilly, Paris, and Louis Michel, Boulogne, France, assignors to Electronique Marcel Dassault, Paris, France, a corporation of France
Filed May 14, 1963, Ser. No. 280,306
Claims priority, application France, May 18, 1962, 898,052
17 Claims. (Cl. 343—7)

The invention relates to an airborne system for automatically piloting an aircraft or missile.

It is an object of the invention to provide a system of this character designed to enable an aircraft or missile to be piloted in hedge-hopping flight, that is to say at a very low altitude, thus under circumstances in which the aircraft or missile is most likely to escape detection by enemy observation systems.

In this respect, it is an object of the invention to provide means in such system to ensure that an aircraft or missile flies at a relatively low altitude which remains substantially constant despite the irregularities of the ground.

It is also an object of the invention to provide means in such system to enable the altitude of flight to be adjusted at will.

It is a further object of the invention to provide means to ensure the clearing of an obstacle at a predetermined constant relative altitude and with a horizontal velocity vector at the moment of clearing.

It is also an object of the invention to provide means in an apparatus which makes optimum use of the maneuvering capabilities of the aircraft or missile.

It is a further object of the invention to provide an apparatus which offers complete safety, that is to say which is operational and ensures that the aircraft has its optimum flight path whatever the direction of flight of the aircraft in relation to the horizontal.

It is also an object of the invention to provide a system which permits the use of existing equipment normally available in the majority of aircraft and which is thus simpler to carry out.

It is furthermore an object of the invention to provide such an apparatus which will be entirely automatic, relieving the pilot of the worry of piloting when hedge-hopping and thus enabling him to concentrate his faculties on the accomplishment of his mission.

More generally, it is an object of the invention to provide an apparatus which ensures hedge-hopping flight under the optimum conditions, which is easy to manufacture and which is reliable in operation.

According to the invention a fictitious curve or guard curve is associated with the aircraft (hereinafter the term "aircraft" will designate not only a piloted aircraft but also a pilotless aircraft or missile) and the maneuvers of the aircraft to change its altitude, through variation in attitude, are controlled as a function of the position of said guard curve in relation to the relief of the ground situated below and ahead of the aircraft.

The invention provides means for controlling these maneuvers as a function of the distances of the various points in the terrain profile from the guard curve.

One feature of the invention lies in the fact that the maneuvers are controlled in a continuous manner as a function of said distances as soon as these become sufficiently short to render a modification of the flight path of the aircraft desirable in order to make allowance for the presence of a relief or obstacle.

The invention further provides means for measuring such distance in a direction normal to the guard curve at the various points on that curve (thus along its radius if the guard curve is an arc of a circle), an obstacle located on one side or the other of the guard curve having opposite effects on the maneuvers of the aircraft.

Moreover, according to the invention, a control factor for the attitude of the craft includes not only said distance but also the variation in said distance (i.e. positive or negative increments thereof) as a function of time, so that altogether a control is obtained which is devoid of any oscillatory character.

The invention further provides means for varying the direction of the velocity vector of the aircraft in relation to a fixed direction, for example the horizontal, on the basis of the aforementioned control factor which is based upon the distance of the guard curve from an obstacle and upon the variation in said distance, the most simple means being by variation in the deflection of a horizontal control surface (i.e. that of the elevators of the craft).

Still another feature of our invention resides in the fact that it is the same apparatus which is used for the piloting whether the aircraft is traveling with a horizontal, ascending or descending velocity, and this is so despite the diversity of the conditions which have to be fulfilled. Thus, for an aircraft with descending velocity, a guard curve associated with a fictitious aircraft with horizontal velocity which can be deduced very simply from the real aircraft is used as part of the guard curve of the real aircraft and confers on the real aircraft the margin of safety required for its descending flight.

According to a more particular feature of our invention, the guard curve associated with the fictitious aircraft may be extended rearwardly by an arc of a circle concentric with the arc of minimum pitch-up radius.

In this instance, according to a further feature of our invention, the rear portion of the guard curve consists not of said arc of a circle concentric with the arc of minimum pitch-up radius but of the rearward extension of the guard arc of the fictitious aircraft, said extension being little different from the rear portion of the theoretical guard arc. The parameters necessary for carrying out the invention can then be calculated by the same apparatus as that used in the case where the velocity vector of the aircraft forms an angle of zero or a positive angle with the horizontal.

An embodiment of our invention comprises an analogue computer adapted to generate, in a continuous manner, the instruction given to the autopilot of the aircraft which causes it to follow the optimum flight path at low altitude.

According to another embodiment comprising a digital computer to generate the instruction, the survey, by radar, of the contours of the ground in front of the aircraft, in the vertical plane passing through the longitudinal axis thereof, is effected in a discontinuous manner, the data provided by said survey being stored in a digital computer which uses them after the survey time to generate the instruction to be given to the autopilot to cause it to guide the craft along its optimum flight path. During this phase of operations, the radar which has surveyed the contours of the ground may be used for other purposes, particularly to fulfill the functions which normally devolve upon an ordinary aircraft radar set. The radar according to the invention, including its aerial, therefore serves a multiple purpose which enables it to replace the radar used, for example, for the guiding of an air-to-air missile or an air-to-ground missile or for homing on a beacon or for the tracking of a target.

The invention thus enables a digital computer, included in an apparatus for controlling the maneuvering of a low-flying aircraft, to be used for other purposes, so that, ultimately, the presence of an apparatus according to the invention for the control of the low-flying craft does not substantially increase the weight and/or the overall size of its equipment.

The invention will be better understood from the following description given by way of example. In this description, reference is made to the accompanying drawing in which:

FIG. 19 shows yet another condition of flight;

FIG. 20 shows still another condition of flight;

FIG. 21 is a scanning diagram for a radar aerial for a system embodying our invention;

FIG. 22 is a diagram explaining the operation of this embodiment;

FIG. 23 is an explanatory diagram likewise relating to the embodiment of FIG. 21; and FIG. 24 defines programs and subroutines.

Figure 1:
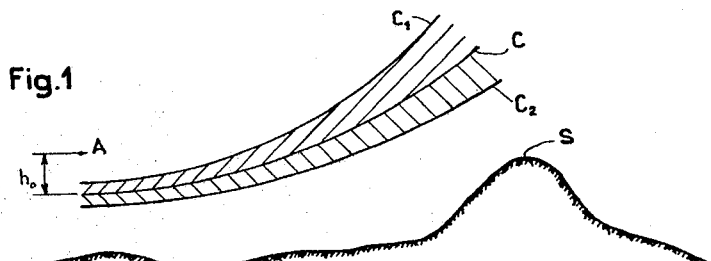
FIG. 1 is a diagram of an aircraft and of a guard surface associated therewith.

Reference will first be made to FIG. 1. A guard curve C defined in the following manner is associated with or assigned to an aircraft A. It passes through a point situated on the vertical line from the aircraft A downwards, at a distance from the aircraft substantially equal to the minimum altitude $h_0$ of flight above the ground which it is desired to impose on the aircraft. Said curve has its concavity turned towards the aircraft and its points situated in front of the aircraft are at a distance from the aircraft which increases progressively with increasing distance from the point of the curve located immediately below the craft with a spacing substantially equal to $h_0$.

The invention provides means for controlling the maneuvers of the aircraft in such a manner that an obstacle which appears in front of the aircraft never remains within the portion of space inside the guard curve associated with the aircraft, that is to say situated on the same side thereof as the aircraft.

In conformity with our invention, the piloting of the aircraft takes place in such a manner that the guard curve associated with the aircraft passes substantially over the obstacles which appear in front of the aircraft or in the immediate vicinity thereof.

According to the invention, the flight path of the aircraft is modified as soon as an obstacle comes within a distance of the guard curve which is less than a given value increasing with distance from the aircraft.

The extent of the modification of the flight path depends upon the value of said distance, the action under this heading becoming zero when said distance becomes zero.

The invention provides not only for a guard curve C to be associated with the aircraft, as defined, but also for two limit curves $C_1$ and $C_2$ flanking said guard curve, one on each side, these limits being relatively close to the guard curve along a portion thereof which is closest to the aircraft but moving progressively away from said guard curve, with regular divergence, at points more remote from the aircraft.

The invention thus provides a pilotage system which gives instructions to the autopilot if any obstacles whatsoever penetrate within the zone bounded by the curves $C_1$ and $C_2$, thus ensuring the continuity of the control. This zone may be a substantially plane zone situated in the vertical plane passing through the longitudinal axis of the aircraft. The invention likewise provides for a three-dimensional zone, the notion of limit curves then being replaced by that of a limit surface, the curves $C_1$ and $C_2$ then being the section of said surface through the vertical plane passing through the velocity vector of the aircraft and the operational volume then being approximately in the form of an incurved cone.

According to the invention, the autopilot does not receive any modifying instruction so long as the guard volume or surface does not encounter any obstacle and, in these circumstances, the aircraft is controlled in such a manner as to cause it to follow a pitch-down flight path of minimum radius, thus enabling the aircraft or missile to be brought into hedge-hopping flight as quickly as possible, if it was not already there, as soon as the automatic hedge-hopping flight-control apparatus is rendered operative.

When the guard surface or volume encounters an obstacle, the influence on the variation of the angle of elevation of the velocity of the aircraft with the horizontal is in one sense or the other according to whether, in the course of the displacement of the aircraft, it is only the zone situated below the guard curve C which is intercepted by an obstacle or whether the zone situated above the curve C is likewise intercepted by at least one obstacle, the influence acting to reduce that elevation in the first case and to increase it in the second case.

Figure 2:
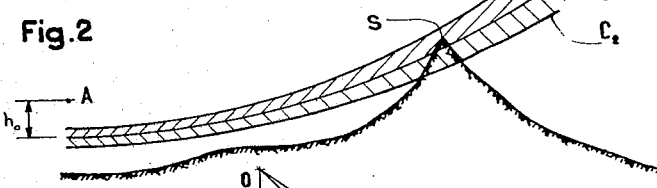
FIG. 2 is a diagram similar to FIG. 1, but for different circumstances.

In the case of FIG. 2, for example, an aircraft A, propelled with a horizontal velocity or one whose vector forms a positive angle of elevation with the horizontal, i.e. is directed upwards, is controlled in such a manner that the value of said angle tends to increase in proportion to the penetration of the obstacle S into the hatched surface bounded by the curve C and the curve $C_1$.

Such a control, according to which an increase in said angle is only obtained when the guard curve approaches or encounters an obstacle, ensures that the aircraft has a flight path such that the guard surve which is associated therewith tends to skim over the obstacles which appear ahead of the aircraft and below it, without allowing itself to be deeply penetrated by said obstacles.

If the obstacle is below the guard curve, for example, the variation in the orientation of the velocity vector is such that said guard curve approaches the obstacle while descending towards it whereas if the obstacle projects inside the guard curve the variation in the orientation of the velocity vector is such that the guard curve approaches the apex of the obstacle, considered in the direction perpendicular to the guard curve, by an upward-sweeping movement.

In particular, pursuant to a specific feature of our invention, the variation in the orientation of the velocity vector of the aircraft is controlled not only as a function of the distance of the guard curve from the obstacle as measured along the normal to said guard curve but likewise as a function of the variation in said distance as a function of time, this factor rendering it possible to take into consideration the orientation of the velocity vector of the aircraft at the moment when the instruction is given for variation in the orientation of said vector and furthermore making the system substantially devoid of any tendency to hunt. The resulting control has the degree of damping required in order to obtain a satisfactory stability.

The guard curve according to our invention may have the shape of an arc of a circle which will now be defined; the case where the velocity vector of the aircraft is horizontal or directed upwards and the case where said velocity vector is directed downwards will be considered in succession.

Figure 3:
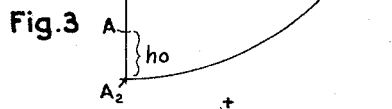
FIG. 3 shows a guard curve.

In the case where the velocity vector is horizontal or directed upwards, the aircraft A (FIG. 3) then has associated with it the guard arc passing through the point $A_2$ situated on the vertical of A, below said point A and at a distance therefrom equal to the minimum altitude $h_o$; the center O of said arc is situated on the vertical of A, above the latter, at a distance from A equal to $$(R_c + R_p - h_o)$$

$R_c$ and $R_p$ being respectively the minimum pitch-up radius and the minimum pitch down radius peculiar to the aircraft. The guard arc C which is associated with the aircraft and whose radius is $R_p + R_c$ therefore passes through the point $A_2$, which is its origin, and is directed forwardly.

Figure 4:
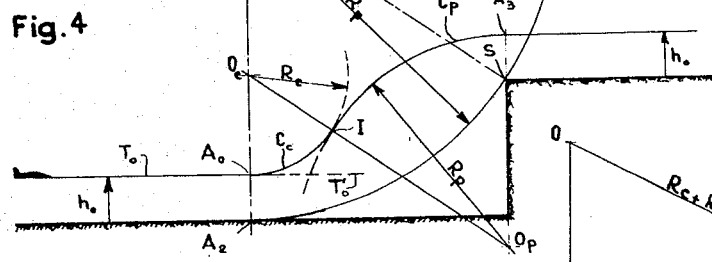
FIG. 4 shows a particular condition of flight over an obstacle.

Reference will now be made to FIG. 4, an aircraft is under consideration which is at the position $A_O$, at an altitude $h_o$, and whose velocity vector is horizontal. For example, the aircraft may have traveled the path shown at $T_O$. Associated with the aircraft $A_O$ is a guard circle $C_O$. This circle passes through the point $A_2$, the meeting point between the vertical passing through $A_O$ and the ground; its center O is at the distance from $A_O$ equal to:

$$(R_p + R_c - h_o)$$

a point S is arbitrarily selected on said circle $C_O$ in front of $A_2$. The vertical is taken through S and on the descending portion a point $O_p$ is selected at a distance from S equal to $(R_p - h_o)$. On the other hand, a point $O_c$ is selected on the vertical of $A_O$, upwards, at the distance from $A_O$ equal to $R_c$. This gives:

$$OO_c = OA_2 - A_OA_2 - O_cA_O$$

which can be written $$OO_c = R_p + R_c - h_o - R_c$$

whence $$OO_c = R_p - h_o$$

Since $SO_p = R_p - h_o$, the quadrilateral $O-O_c-O_p-S$ is therefore a parallelogram, its two parallel sides $OO_c$ and $SO_p$ being equal; its other two sides are equal and of a length $$OS = O_cO_p = R_c + R_p$$

If the arc of a circle $C_c$ with the center $O_c$ and of radius $R_c$ is drawn starting from $A_o$, it intersects the straight line $O_cO_p$ at I. In this case:

$$IO_p = O_cO_p - O_cI$$

that is to say:

$$IO_p = R_p + R_c - R_c = R_p$$

Therefore, if an arc is drawn with the center $O_p$ and of radius $O_pI$, this arc may be considered as a minimum-pitch-down arc and at its end $A_3$, on the vertical of $O_pS$, the tangent to this arc is horizontal. Therefore, an aircraft which has reached $A_O$ may, by traveling along the arc $A_OI$ which is the arc of minimum pitch-up radius and along the arc $IA_3$ which is the arc whose radius is the minimum pitch-down radius, reach $A_3$ at an altitude above S equal to $h_o$, its velocity vector at $A_3$ being horizontal. If S is considered as the apex of an obstacle indicated by hatching, suitable instructions given to the autopilot when the arc $C_O$ passes over S still enable the aircraft $A_O$ to follow a flight path compatible with its maneuvering limits to enable it to fly over the obstacle S at the altitude $h_o$ while having a horizontal velocity vector. It is clear that for an aircraft situated on the flight path $T_o$ upstream of $A_o$ it is, a fortiori, possible to give it instructions so that it will fly over S at the altitude $h_o$ with a horizontal velocity vector without ever having to follow a path having a radius of curvature incompatible with the characteristics of the aircraft. On the other hand, once an aircraft has reached any point on the extension $T_o'$ of the flight path $T_o$ beyond $A_o$, it would no longer be possible to give it instructions enabling it to fly over the obstacle S at the altitude $h_o$ without subjecting the aircraft to stresses incompatible with its construction.

The invention is also realizable in the case where the angle of elevation of the velocity vector of the aircraft is negative, i.e. the craft is heading downwardly with the same safety factor as in the case where the velocity vector forms a positive or zero angle with the horizontal.

Figure 5:
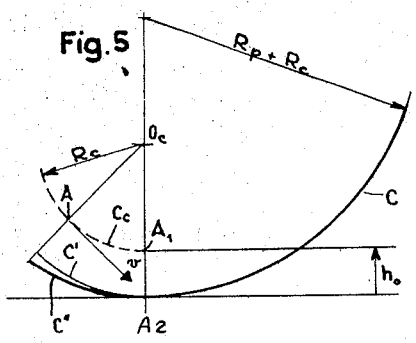
FIG. 5 is a view similar to FIG. 3 but for different circumstances.

According to this feature of our invention, the curve associated with the aircraft A in the case where its velocity vector has a negative orientation (FIG. 5) is the guard curve associated with a fictitious aircraft $A_1$ situated on a circular arc $C_c$ drawn from the real aircraft A, tangential to the velocity vector of said real aircraft and having as its radius the minimum pitch-up radius, the fictitious aircraft being situated on the point of said arc where the tangent is horizontal. The guard curve of the real aircraft then consists of the guard curve of the fictitious aircraft as defined above and also of the arc C' of the circle wth the center $O_c$ and of radius $R_c + h_o$, starting from $A_2$ until it meets $O_cA$.

The selection of this guard curve can be explained as follows: If the aircraft is at A and its velocity vector $v$ forms a negative angle with the horizontal, the same conditions as before are found if the point $A_1$, situated on the arc starting from A whose radius is the minimum pitch-up radius $R_c$, is at the minimum altitude $h_o$ which has been laid down, because the aircraft A can, effectively, reach $A_1$ by describing the arc $C_c$ of minimum pitch-up radius. The selection of the guard arc associated with the horizontally moving aircraft $A_1$, and extended rearwardly at C'', as a guard curve for the aircraft A places this aircraft in the same scanning conditions, from the point of view of its hedge-hopping flight, as the fictitious aircraft $A_1$ considered above. It will be seen that in each case, i.e. in the situation illustrated in FIG. 4 as well as the one depicted in FIG. 5, the center O of the guard circle of radius $R_c + R_p$ lies on a vertical line passing through the lower point or nadir $A_1$ and the center $O_c$ of a circle of radius $R_c$, the line from the position A of the craft to the center $O_c$ being perpendicular to the motion $v$ of the craft.

It is possible, according to another feature of our invention, to replace the arc C' by the rearward extension C'' of the arc C between point $A_2$ and the straight line $O_cA$, with a consequent increase of the radius of the guard curve from $R_c + h_o$ to $R_c + R_p$.

Figure 6:
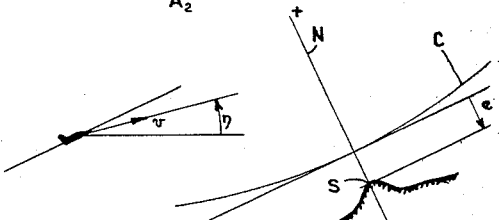
FIG. 6 is an explanatory diagram.

In accordance with our invention, the maneuvers of the aircraft, as regards altitude, are controlled first of all as a function of the minimum distance $e$ (FIG. 6) between the guard curve C and an obstacle S to be cleared, said distance being measured along the normal N drawn from S on the guard curve C. The control is effective in one sense or the other according to the sign of the distance $e$ which may, for example, be calculated positively when S is within the guard circle and, on the other hand, negatively when S is outside the guard circle.

The invention likewise provides for this maneuver to be controlled as a function of the variation in said distance $e$ in relation to time, that is to say as a function of $de/dt$.

If $\eta$ is the angle of elevation which the velocity vector $v$ of the aircraft form with the horizontal, $\eta$ being counted positively when the velocity vector is above the horizontal and negatively when the velocity vector is below the horizontal, the fundamental equation is then:

$$\frac{d\eta}{dt} = G\left(e + T\frac{de}{dt}\right) \quad (1)$$

In this formula, G is a gain constant and T is a constant whose dimension is that of time.

The invention provides for determining e, which is the radial distance, of an obstacle S (FIG. 7) from the circle C, to the extent that the said obstacle is inside the zone bounded by the curves $C_1$ and $C_2$ surrounding the circle C, by measuring at each moment, through a radar apparatus and a computer associated therewith, a distance $d\rho$ intercepted along the radius vector $\rho$ which extends from the aircraft A to the obstacle S and by projecting said distance $d\rho$ not on the guard-circle radius which passes through S but on the guard-circle radius which passes through the intersection P of the circle with the radius vector $\rho$, said projection being the measurement of e, with a sufficinet approximation, and being easy to determine.

Figure 7:
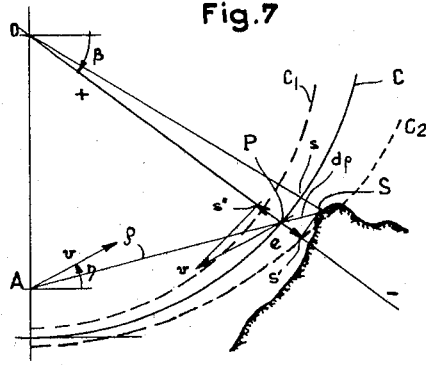
FIG. 7 is a diagram defining geometrically the factors controlling the maneuvers.

In FIG. 7, the distance $d\rho$ is the length of the segment PS. The invention provides for the determination of a distance P$s'$ ($s'$ being the projection of S on the radius OP) which is comparable to $s$S, s being the intersection of the guard circle C with line OS. In the case here illustrated, when $s'$ is outside the circle C, the distance e has the sign — (minus). If $s'$ were inside the circle C, said distance would have the sign + (plus).

In order to determine $de/dt$, the invention provides— instead of effecting a plurality of measurements of e at known intervals of time and of measuring the difference between these measurements by relating them to the time separating said measurements—for $de/dt$ to be determined instantaneously and at any moment, by taking advantage of the fact that, since the guard circle is associated with the aircraft, all its points, and particularly the point P, are displaced at every moment at the velocity $v$ of the aircraft and that the projection of this velocity in any direction is representative of the differential, with respect to time, of a distance measured in the reference system in relation to which the said velocity is determined and which in the present case is the distance from a point on the ground, the ground serving as a reference for the definition of the velocity $v$. In the system of FIG. 7, the value of $de/dt$ at the point P is represented by the length of the segment P$s''$ which is the projection of the vector $v$ on the radius OP, the value of $de/dt$ being counted positively when $s''$ is inside the guard circle and negatively when $s''$ is outside the guard circle. According to the invention, therefore, it is possible to determine $de/dt$ by having recourse to the existing facilities on an aircraft for determining the velocity $v$, in magnitude and in orientation, in relation to the ground, such facilities often consisting of a radar known as a Doppler radar, and by calculating the projection of this velocity vector on the radius of the guard circle leading to the point of said circle intersected by the beam of the radar according to the invention already provided for the determination of e.

Figure 8:
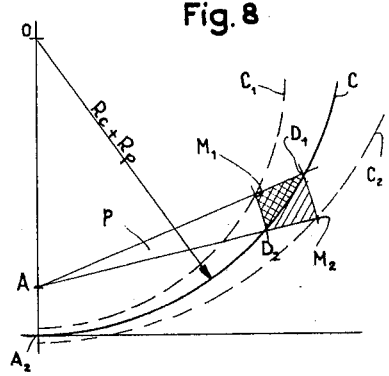
FIG. 8 shows diagrammatically a scanning beam for the guard surface.

Reference will now be made to FIG. 8. In this figure, $p$ represents diagrammatically a beam of electro-magnetic waves emitted, by an apparatus of the type of tracking radar with line-of-sight scanning, along a certain angle above the horizontal and likewise at a certain angle below the horizontal, which may be greater than the former, as a function of the portion of the guard circle to be described. The upper limit of the beam $p$ intersects the guard circle C at $D_1$ and the lower limit intersects the circle C at $D_2$. Arcs centered on A are drawn through $D_1$ and $D_2$ as far as the other limit of the beam and thus the points $M_1$ and $M_2$ are obtained. The curves $C_1$ and $C_2$ are those described by the points $M_1$ and $M_2$ in the course of the scanning by the radar; they define the section of space in which the radar is effective. In the example of FIG. 8, the arcs centered on A, i.e. $M_1D_2$ and $M_2D_1$ correspond to the limits of the range gate of the tracking radar; if an obstacle is present in the outer zone indicated by simple hatching, the factor dependent on e which intervenes in the control of the variation of the orientation of the velocity vector of the aircraft has a negative sign; if an obstacle is present in the inner zone indicated by cross-hatching, said factor has the + sign; if an obstacle is present in a zone which is not hatched, the apparatus does not perform any control functions.

Thus, an analogue or digital computer associated with the tracking radar permits the description of the curves $C_1$ and $C_2$ through variation in the limits of its range gate.

Figure 9:
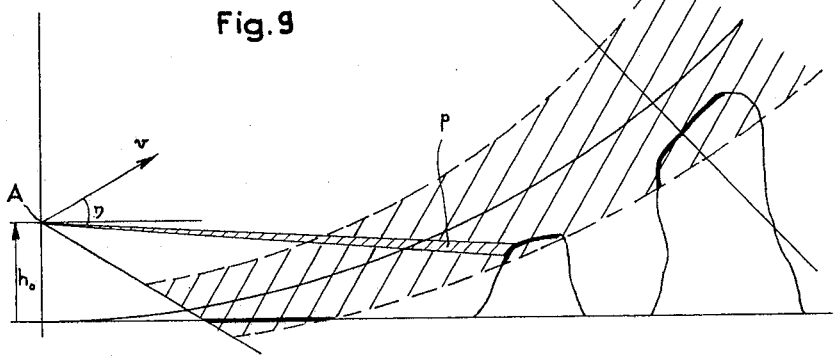
FIG. 9 shows diagrammatically an example of scanning, by means of a radiation beam, various obstacles placed in front of the aircraft.
Figure 10:
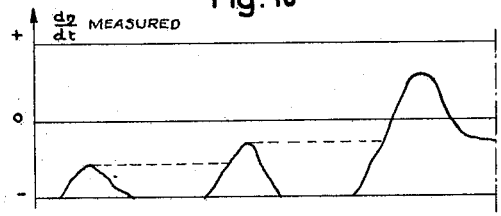
FIG. 10 is a diagram relating to the procedure outlined in FIG. 9.

Reference will now be made to FIG. 9. The aircraft A is at the altitude $h_0$, its velocity vector $v$ forming a positive angle $\eta$ with the horizontal. The guard surface, which is hatched, encounters obstacles and the command signal or instruction given from each obstacle has the form:

$$\frac{d\eta}{dt} = G\left(e + T\frac{de}{dt}\right) \quad (1)$$

at each moment. In the course of the scanning by the electro-magnetic beam $\rho$ from the lower limit to the upper limit (the portions of the outline of the obstacles shown with heavy outlines are those from which signals are received), the measured value of $d\eta/dt$ may, for example, be of the form shown in FIG. 10.

Figure 11:
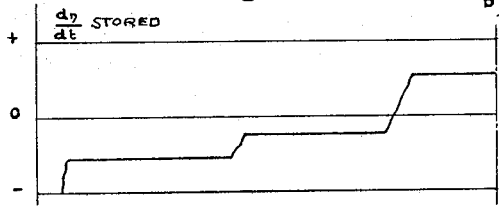
FIG. 11 is a diagram illustrating a modified procedure for exploring the terrain of FIG. 9.

In lieu of registering at each moment the instantaneous value of $d\eta/dt$, it is possible to store the maximum value attained by $d\eta/dt$ from the beginning of the half-cycle. The values of $d\eta/dt$ which are so stored, in this instance, are shown in FIG. 11. In the half-cycle in question, the differential $d\eta/dt$ has first a negative value, then a value which is still negative but smaller than the previous one in absolute magnitude, then a positive value. It is this latter which is preserved until the extreme limit of the scan is reached at the end of one half-cycle. It is the same in the course of the scan in the opposite direction in the following half-cycle.

Figure 12:
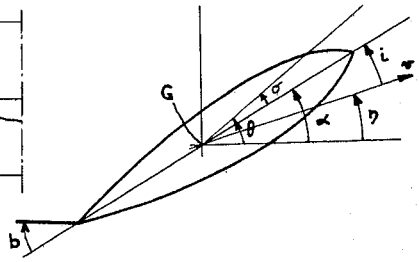
FIG. 12 is a diagram defining linear and angular magnitudes.

Reference will now be made to FIG. 12 to define, in succession, starting from the center of gravity G of the aircraft, the following angles:

The angle of elevation $\eta$ which the velocity vector $v$ of the aircraft forms with the horizontal;

The pitch angle $\alpha$ which the longitudinal direction or axis of the aircraft forms with the horizontal;

The angle of trim $b$ included between this axis and the elevators of the aircraft;

The drift angle $i$ which the velocity vector forms with said axis of the aircraft;

The relative sweep angle $\sigma$ which the axis of the radar beam forms with the axis of the aircraft;

The absolute sweep angle $\theta$ which the axis of the beam forms with the horizontal.

Figure 13:
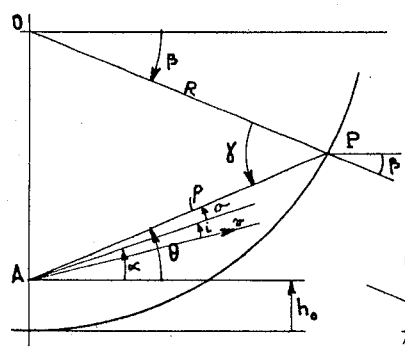
FIG. 13 is a geometric diagram explaining the operation of a computer.

Reference will now be made to FIG. 13 in which there is drawn, starting from a point P on the guard circle, on the one hand the straight line AP constituting the axis of the beam emitted by the aircraft from the tracking radar and on the other hand the radius OP. Hereinafter:

The angle of inclination formed between OP and the horizontal is designated $\beta$;

The vertex between OP and the straight line AP, oriented as indicated by the arrow, is designated $\gamma$;

The length of the radius vector AP is designed $\rho$.

It will be seen that:

$$\theta = \alpha + \sigma \quad (2)$$

in magnitude and in sign.

$\alpha$ is known at every moment on the aircraft and the same applies to $\sigma$. The angle $\theta$ can therefore be determined at any moment.

Between the angles $\beta$, $\theta$ and $\gamma$ there exists the relationship $$\beta = \theta - \gamma \quad (3)$$

and there are two other relationships which are derived from consideration of the triangle OAP and which are:

$$\frac{R-h_o}{\sin \gamma} = \frac{R}{\cos \theta} = \frac{\rho}{\cos \beta} \quad (4)$$

in which R and $h_o$ are given.

The two relationships (4) may also be written:

$$\sin \gamma = \frac{(R-h_o) \cos \theta}{R} \quad (5)$$

$$\rho = \frac{R \cos \beta}{\cos \theta} = \frac{(R-h_o) \cos \beta}{\sin \gamma} \quad (6)$$

The tracking radar enables $\rho + d\rho$ to be known at any moment to the extent that the detected obstacle lies in the guard surface or the guard volume.

The above formulae show that it is possible to calculate $\rho$ and hence to know $d\rho$ by applying $$d\rho = (\rho + d\rho) - \rho \quad (7)$$

From these relationships, accordingly, it is possible to calculate $\beta$, hence $e$ which is the projection of $d\rho$ on the line OP including the angle $\beta$ with the horizontal.

The knowledge of $\beta$ permits the determination by calculation of $de/dt$ which is the projection of a vector $v$, whose magnitude and orientation are known by means of the Doppler radar, in accordance with the formula:

$$de/dt = v \cos(\eta - \beta) \quad (8)$$

Figure 14:
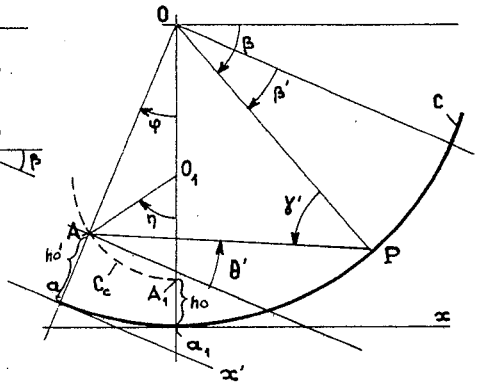
FIG. 14 is similar to FIG. 13 but for different circumstances.

Reference will now be made to FIG. 14 which is similar to FIG. 13 but which deals with the case where the aircraft A, at the moment in question, has a velocity vector which is oriented negatively. From the aircraft A, the positions of the fictitious aircraft $A_1$ is deduced as explained above with reference to FIG. 5. Because the guard curve according to the invention is so chosen in this case that the portion $a_1a$ of the guard curve is the extension of the guard circle C associated with the fictitious aircraft $A_1$, the figure formed by the radius $O_a$, the guard curve and the tangeant $ax'$ at $a$ to the guard curve is analogous to that which is shown in FIG. 13 so that the control factors $e$ and $de/dt$ may be calculated in the same manner as soon as the angle $\varphi$ included between lines $OA_1$ and $OA_0$ and the distance $h'$ between points $a$ and $A$ have been determined, the distance $a_1A_1$ being, by design, equal to $h_o$. If the angle included between the radius vector AP and the tangent $ax'$ is called $\theta^1$, the angle which the radius vector AP forms with the radius OP of the guard circle is called $\gamma'$, and the angle which OP forms with $ax'$ is called $\beta^1$, the angles being oriented as shown by the arrows in FIG. 14, the following relations are obtained:

$$\theta' = \theta - \varphi \, (\varphi < 0) \quad (9)$$

($\theta$ being the angle which AP forms with the horizontal) and $$\tan \varphi = \frac{R_c \sin \eta}{R_p + R_c \cos \eta - h_o} \quad (10)$$

$$h'_o = |aA| = R - |OA| = R - R_c \frac{\sin \eta}{\sin \varphi} = R - \frac{R_p + R_c \cos \eta - h_o}{\cos \varphi} \quad (11)$$

From the values thus calculated for $\theta'$ and $h_o$ there is obtained:

$$\sin \gamma' = \frac{R - h'_o}{R} \cos \theta' \quad (12)$$

$$R \sin \gamma' = (R - h'_o) \cos \theta' \quad (13)$$

$$\beta' = -\gamma' + \theta' \quad (14)$$

$$\rho = \frac{R \cos \beta'}{\cos \theta'} \quad (15)$$

The invention likewise relates to a system which enables the aforedescribed method to be carried out with a simple control system which is reliable in operation and which partially utilizes equipment, already existing on the majority of aircraft, comprising means for providing at any moment the values of $e$ and $de/dt$ appearing in the fundamental Formula 1 above.

Available on the aircraft A is a radar which emits a narrow beam, of the order of one to a few degrees (e.g. 2.5°), which scans, at a frequency which may be of the order of one cycle per second, the space in front of the aircraft in a vertical plane passing through the velocity vector of the latter over an angle which is sufficient to ensure detection of the obstacles which may appear in front of the aircraft in the course of its flight, particularly when hedge-hopping, such as a scanning sweep being bonded, for example, by sides forming an upward angle of 15° with the horizontal and a downward angle of —15° with the velocity vector. The radar is of the tracking type, that is to say it only allows an echo to appear if the obstacle detected is located within a given section of space situated in front of the radar, the position of the obstacle thus being localized in relation to the forward limit and in relation to the rear limit, the electro-magnetic result being the appearance of an echo in a range gate whose edges correspond precisely to the proximal and distal limits of the effective beam section.

The computer included in the apparatus establishes a point P, which describes the guard circle, along the radius vector $\rho$ of the radar (FIG. 7) which turns in an azimuthal sweep in the course of the scan; the operation of the radar, by determining the distance AS of an obstacle encountered by said radius vector, thus enables the length of the segments PS to be determined and from this the computer enables the length of the projection $e$ of said segment on the normal to be deducted.

Furthermore, the apparatus comprises means for rendering the radar operational from the point of view of the echo only if the obstacle lies between the two curves $C_1$ and $C_2$ which bracket the guard circle C and which, starting from the vertical through the aircraft where the two curves are relatively very close to the arc C without being identical therewith, move progressively away from the guard circle, such a limitation in the action of said radar adapting it to the greater or shorter distance of the obstacles which may appear in front of the aircraft.

The aircraft further comprises means for determining $de/dt$ at each moment.

Figure 15:
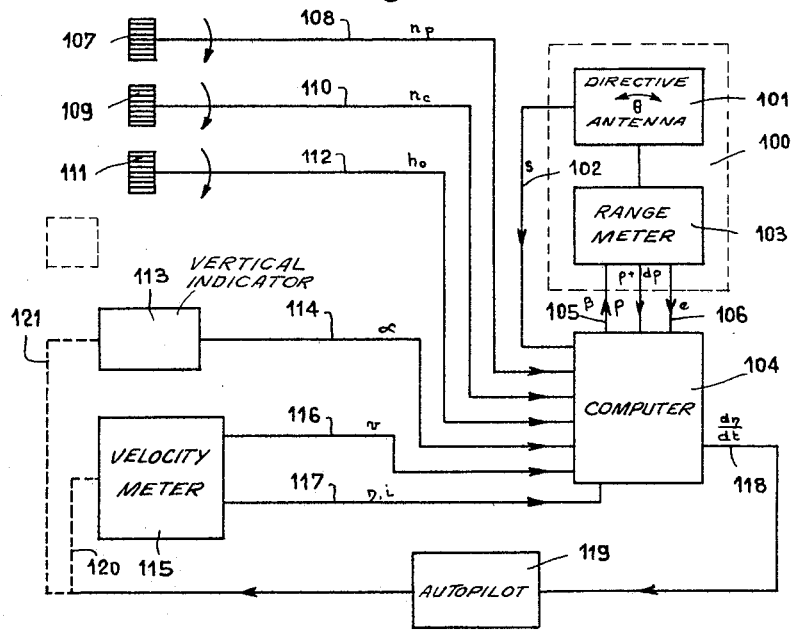
FIG. 15 is a very diagrammatic view of an installation according to the invention.

The general arrangement of a guidance system according to this aspect of our invention is shown in FIG. 15. The radar of the system, generally designated 100, comprises a directive aerial or antenna 101 which scans, in line-of-sight, the space situated in front of the aircraft and which thus supplies, over a channel 102, the angle of sight $\sigma$ of the electro-magnetic beam emitted by the radar. A range-measuring device 103 in the radar receives from a computer 104, through a channel 105, in particular the value of $\rho$, that is to say the magnitude of the radius vector of the guard circle, as a function of the angle $\theta$ which the beam of the radar forms with the horizontal. The information supplied to the range measuring device 103 by the computer 104, particularly the value of $\rho$, enables the range meter 103, in turn, to supply the computer 104 with the value of $e$ through a channel 106. The pitch-down load factor $n_p$ is also introduced into the computer through a knob 107 by means of a channel 108, and the pitch-up load factor $n_c$ is inserted through a knob 109 or the like and a channel 110; and the altitude $h_o$ at which it is desired that the hedge-hopping flight should take place over horizontal terrain is introduced through a knob 111 and a channel 112. A vertical indicator 113 aboard the aircraft introduces the angle of pitch $\alpha$ into the computer 104 through a channel 114. Another device 115 aboard the aircraft, such as a Doppler radar, introduces the modulus of the velocity $v$ of the aircraft into the computer 104 through a channel 116 and the orientation of this velocity vector through a channel 117, either in relation to the horizontal, that is to say the angle $\eta$, or in relation to the longitudinal axis of the aircraft, that is to say the angle $i$. At every moment, the computer supplies, from the data thus fed to it, on the one hand the function $\rho = f(\theta)$ and on the other hand the function $\beta = f'(\theta)$, $\beta$ being the angle included between the horizontal and the normal to the guard circle at the point P. Taking into consideration the additional information supplied to it through the radar 100, the computer 104 delivers at its output into a channel 118 the function $$\frac{d\eta}{dt} = G\left(e + T\frac{de}{dt}\right)$$

as per Equation 1, which is applied to the autopilot 119 of the aircraft as an aerodynamic control function and causes the trim angle $\beta$, i.e. the angle between the horizontal control surface of the elevators and the longitudinal axis of the aircraft (see FIG. 12), to vary in such a manner as to satisfy an equation of the form:

$$Kb = \frac{v}{g} \cdot \frac{d\eta}{dt} + \cos \eta - 1 \qquad (16)$$

(K being a constant peculiar to the craft involved) and which, for small values of $\eta$, simplifies to:

$$Kb = \frac{v}{g} \cdot \frac{d\eta}{dt} \qquad (16a)$$

The variations which result as regards the velocity vector, both in modulus and in orientation, naturally influence the data given by the accessory device 115, as indicated diagrammatically by a channel 120, while a channel 121 indicates diagrammatically the resulting variation of pitch.

Figure 16:
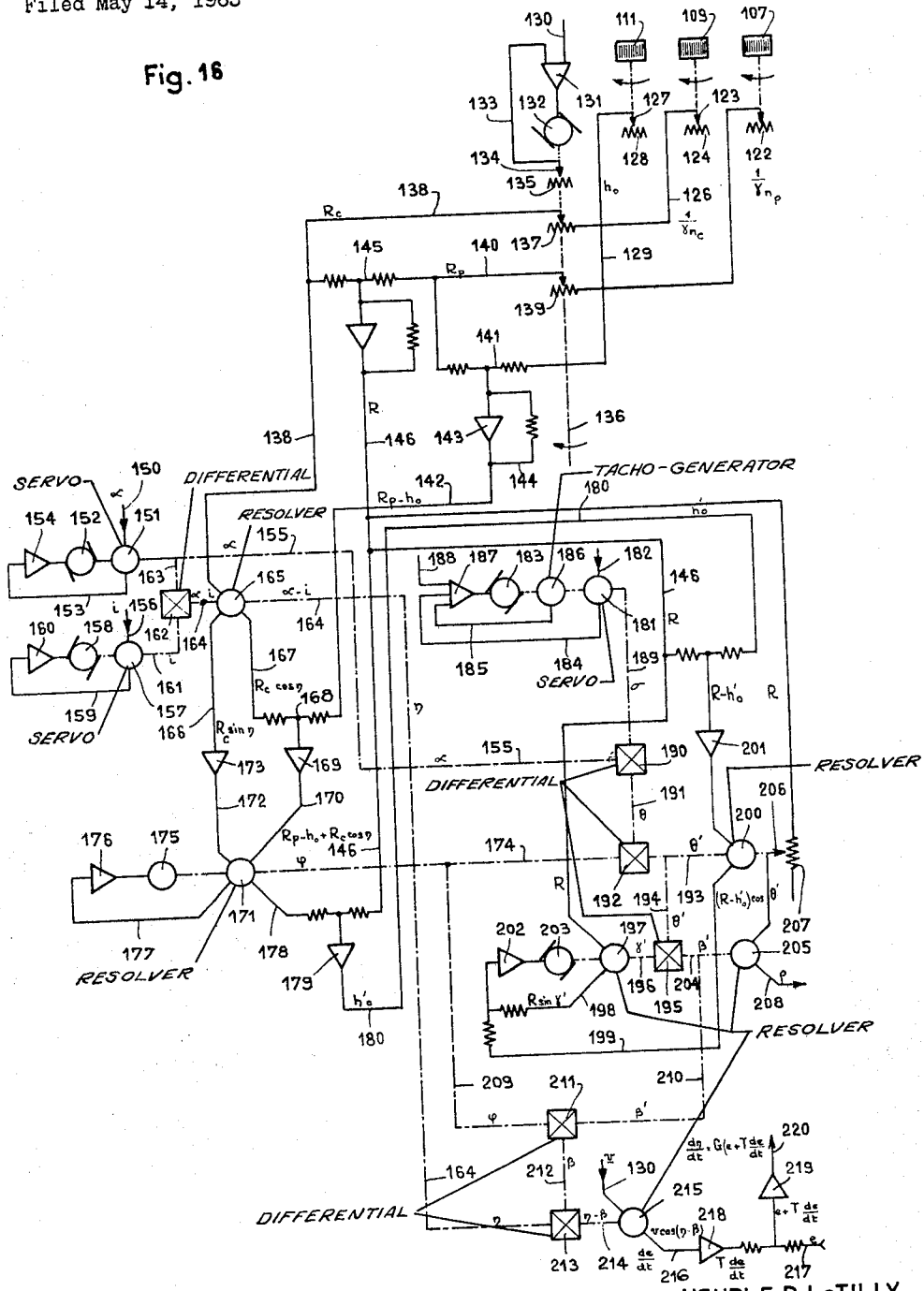
FIG. 16 is a somewhat more developed view of such an installation.

In the embodiment illustrated in FIG. 16, the knob 107 is that of a potentiometer 122 whose resistance is graduated in terms of the reciprocal value of the maximum normal pitch-down acceleration. The knob 109, which drives a sliding contact 123 cooperating with a resistance 124, applies to a conductor 126 a voltage which is the reciprocal value of the maximum normal pitch-up acceleration. The knob 111, which drives a sliding contact 127 of a potentiometer 128, brings a conductor 129 to a potential proportional to the minimum altitude $h_o$ which it is desired to impose on the aircraft. On the other hand, through a conductor 130 a potential is introduced which may be very low and is proportional to the modulus of the velocity of the aircraft and which, after passing through an amplifier 131 with a feedback circuit 133, drives a motor 132 for the displacement of a sliding contact 134 in such a manner that the position of the sliding contact on a resistance 135 varies in accordance with a function proportional to $v$. A potentiometer 137, which is wound in accordance with a quadratic law ($v^2$), receives a voltage proportional to the inverse of the maximum normal pitch-up acceleration and its sliding contact is displaced as a function of the velocity. At its output 138, therefore, it delivers a voltage which is proportional to $R_c$, i.e. the minimum pitch-up radius, on the basis of the well-known relationship $$R_c = \frac{V^2}{qn_c} \qquad (17)$$

($q$ being a constant). Similarly a potentiometer 139, wound in accordance with a quadratic law, delivers at its output 140 a voltage which is proportional to $R_p$ in accordance with the well known formula $$R_c = \frac{V^2}{qn_p} \qquad (18)$$

The output leads 129 and 140 have a junction 141 from which the analogue of the difference $(R_p - h_o)$ is derived at the output 142 of an amplifier 143 with negative feedback 144. The output leads 138 and 140 have a junction 145 from which is derived, through a channel 146, the value of the radius of the guard circle R, according to the formula $$R = R_p + R_c \qquad (19)$$

To the input 150 of a servo 151, there is applied a voltage proportional to the pitch $\alpha$; the motor 152 of the servo is controlled by a line 153 including an amplifier 154 and the output shaft 155 of the servo 151 has an angular position which is a linear function of the pitch angle $\alpha$. From the ancillary device 115 (FIG. 15), here assumed to be a Doppler radar, there is derived a voltage which is proportional to the angle $i$ between the velocity vector of the aircraft and the longitudinal axis thereof which is taken as positive when oriented upwards from the velocity vector, said voltage being applied to the input 156 of a servo 157 whose motor 158 is controlled by a line 159 including an amplifier 160, the output shaft 161 of the servo having an angular position which varies as a linear function of the angle $i$. Shaft 161 drives a differential 162 which is also driven through a shaft 163 branched off from the shaft 155 and the angular position of which is thus a linear function of the angle of pitch, the position of the output shaft 164 of the differential thus being a linear function of the difference $(\alpha - i)$. This difference, which is precisely the angle of elevation $\eta$, is introduced into a resolver 165 which also receives, through the output 138, a voltage proportional to $R_c$. Thus, the resolver 165 delivers at its output 166 a voltage proportional to $R_c \sin \eta$ and at its output 167 a voltage proportional to $R_c \cos \eta$.

The output 167 acts, in common with the output 142 whose voltage is characteristic of $(R_p - h_o)$, through a junction 168 on an amplifier 169 whose output 170 carries a voltage representative of $$R_p - h_o + R_c \cos \eta$$

A resolver 171, which is actuated on the one hand by the output 170 and on the other hand by the output 172 of an amplifier 173 carrying a voltage representative of $$R_c \sin \eta$$

has a shaft 174 whose position therefore is a linear function of $\varphi$ in accordance with the aforestated relationship:

$$\tan \varphi = \frac{R_c \sin \eta}{R_p + R_c \cos \eta - h_o} \qquad (10)$$

The driving motor of the resolver 171 is shown at 175 and its control circuit 177 includes an amplifier 176.

The resolver 171 likewise has an output 178 at which the voltage $$\frac{R_c \cos \eta + R_p - h_o}{\cos \varphi}$$

is present.

This voltage is added to the voltage characteristic of R, present in the channel 146, through an amplifier 179 at the output 180 of which there is picked up a voltage which is characteristic of $h'_o$ in accordance with the formula:

$$h'_o = R - \frac{R_p + R_c \cos \eta - h_o}{\cos \varphi} \qquad (11)$$

At its electrical input 182, a further servo 181 receives a voltage which depends directly on the position of the aerial 101 of the radar 100 (FIG. 15); this servo is driven by a motor 183 which is controlled on the one hand through a channel 184 from the output of the servo 181 and on the other hand through a channel 185 from a tacho-generator 186 with an interposition of an amplifier 187 to which the electrical control factor of the aerial 101 is applied through the conductor 188. The output shaft 189 of the servo 181 registers the relative sweep angle σ and drives a differential 190 also driven by the shaft 155 whose position is characteristic of the angle α, the output shaft 191 of said differential having a position which is a linear function of the angle θ as per Equation 2; shaft 191 thus rotates constantly first in one direction then in the other, according to the scanning of space carried out by the aerial 101. The shaft 191 forms one input shaft of a differential 192 whose other input shaft 174 has an angular position characteristic of the angle φ. The output shaft 193 of the differential 192 has a position which is characteristic of the angle θ' in accordance with the relationship:

$$\theta' = \theta - \varphi \tag{9}$$

as does its branch 194. This latter forms one input shaft of another differential 195 which also has an input shaft 196 constituted by the output of a resolver 197 receiving an electrical input variable representative of R through the channel 146. If γ' is representative of the position of said shaft 196, the voltage present at the output 198 of the resolver 197 is $$R \sin \gamma'$$

and is added to that which is present in the output channel 199 of a resolver 200 whose input shaft is the shaft 193. The resolver 200 receives, by means of an amplifier 201, the sum of the voltages present in the conductors 146 and 180, i.e., a signal $(R-h'_0)$, so that it is the voltage $(R-h'_0) \cos \theta'$ which is carried on the conductor 199 and which is added to that present on the conductor 198 to operate, by means of an amplifier 202, the driving motor 203 of the resolver 197; the angle of the shaft 196 of this latter operates on the relationship:

$$R \sin \gamma' = (R-h_0) \cos \theta' \tag{13}$$

and therefore characterizes the angle γ'.

The output shaft 204 of the differential 195, whose input shafts have angular positions which are linear functions respectively of θ' and of γ', therefore has an orientation which is characteristic of the angle β', according to the relationship:

$$\beta' = \theta' - \gamma' \tag{14}$$

indicated above.

The shaft 204 is the driving shaft of a resolver 205 whose electric input voltage is proportional to $$\frac{1}{\cos \theta'}$$

in accordance with the position of a sliding contact 206 keyed onto the shaft 193 and cooperating with a resistance 207 to which is applied a voltage R from lead 146; thus the signal on output 208 of the resolver 205 has the form:

$$\frac{R \cos \beta'}{\cos \theta'}$$

An arm 209 of the shaft 174 and an arm 210 of the shaft 204 form the inputs of a differential device 211 whose output shaft 212 has a position characteristic of the angle β by virtue of the formula (see FIG. 14):

$$\beta = \beta' + \varphi \tag{20}$$

The shaft 212 forms an input shaft of a differential 213 having as its other input shaft the shaft 164 whose angular position is characteristic of η; thence, the output shaft 214 of the differential 213 represents the angle η−β.

The shaft 214 drives a resolver 215 to which is applied, through the channel 130, a voltage proportional to the modulus of the velocity vector v of the aircraft, the voltage at the output 216 of the resolver 215 thus being of the form:

$$v \cdot \cos (\eta - \beta)$$

and being therefore representative of de/dt, pursuant to relationship (8).

The range-measuring device 103 of the radar 100 also delivers, over a channel 217, a voltage equal to e; this voltage is added to that emerging from an amplifier 218, whose E.M.F. amplification factor (e.g. of numerical value 5) represents the factor T in Equation 1, and the whole passes through an amplifier 219 with a gain equal to G, the voltage present on the output lead 220 thereof thus being representative of dη/dt which is precisely the instruction to be given to the automatic pilot of the aircraft.

Figure 17:
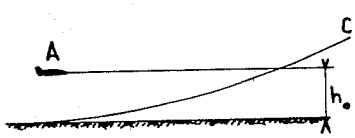
FIG. 17 shows one condition of flight.

Reference will now be made to FIG. 17 which shows an aircraft A equipped with a piloting installation according to the invention and flying horizontally over horizontal ground at a prescribed minimum altitude; it is maintained in horizontal flight at this predetermined altitude $h_0$ so long as the guard curve C associated with the aircraft does not encounter or come close to an obstacle.

Figure 18:
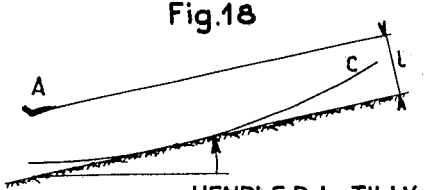
FIG. 18 shows another condition of flight.

FIG. 18 shows the flight path of an aircraft or missile A, equipped with an installation according to the invention, over ground which is substantially plane but is inclined in relation to the horizontal. The flight path is a straight line parallel to said plane and at an altitude l substantially equal to $h_0$. The guard curve or circle C associated with the aircraft remains tangential to the ground.

Under the conditions of FIG. 1, the guard surface associated with the aircraft and shown hatched—the aircraft A having a velocity vector whose orientation is positive or zero—does not encounter any obstacle; the maximum pitch-down instruction is given to the aircraft. This instruction is followed until an obstacle penetrates inside the guard surface. The aircraft then receives instructions in accordance with the fundamental formula:

$$\frac{d\eta}{dt} = G\left(e + T\frac{de}{dt}\right) \tag{1}$$

which modifies the orientation of its velocity vector in such a manner that the guard curve associated therewith tends to slide over the obstacle, the orientation of the velocity vector being modified so as to tend to maintain the vector parallel with the guard curve at the point where this curve passes above the obstacle. It is a situation of this type which is illustrated in FIG. 2.

In the case of FIG. 19, the aircraft A is impelled at a velocity v whose vector has a negative orientation. The guard surface, which comprises a portion common to the guard surface of the fictitious aircraft $A_1$, does not encounter the obstacle. It is the maximum pitch-up instruction which is given to the aircraft.

In the situation shown in FIG. 20, the orientation of the velocity vector associated with the aircraft is negative and the guard surface encounters an obstacle. The variations in the orientation of the velocity vector which are imposed on the aircraft correspond to the fundamental Formula 1 recalled above.

In all cases, the apparatus according to the invention gives to the autopilot of the aircraft instructions which ensure its optimum flight path. In the case where the aircraft is at a high altitude, it is caused, by a pitch-down flight at the radius of minimum curvature, to approach the ground and its flight path is then automatically a line substantially parallel to the ground at the predetermined minimum altitude $h_0$ which ensures the clearing of an obstacle at said altitude with a velocity directed horizontally, without excessive stresses ever being imposed on the aircraft and while taking full advantage of the maneuvering facilities associated with said aircraft.

Reference will now be made to FIGS. 21 to 24 relating to another embodiment. With this embodiment, the process of giving pilotage commands is divided into two parts:

(a) In a first stage, a survey is made in as short a time as possible, of the order of 0.5 second for example, of the contours of the ground which the aircraft is called upon to fly over;

(b) Then the quantification and the storing of the contours of the terrain are carried out in the form of a succession of pairs of numbers. One of the numbers, $X_i$ (FIG. 23), is the abscissa of a point in the profile in a fixed coordinate system $X_1$, $O_1$, $Z_1$ wherein $O_1Z_1$ is the vertical line passing through the aircraft, the number $Z_i$ representing altitude and being the ordinate of said point in the profile in the coordinate system.

The variable $$\left(\frac{d\eta}{dt}\right)_i$$

is determined for each point ($X_i$, $Z_i$) in the profile. The complete calculation for all the points surveyed in the profile is carried out in a time of the order of one second. The value $(d\eta/dt)$ stored is the maximum of the several values thus calculated.

The invention provides for the above calculations to be repeated several times, for example four times, which enables allowance to be made for the movement of the aircraft during an interval of time which may be as short as $\frac{1}{20}$ of a second.

The above method has recourse to radar only for the part (a), that is to say for about $\frac{1}{8}$ of the total time of the program. The rest of the time is used to employ the same radar for lateral visualization, that is to say outside the vertical plane passing through the longitudinal axis of the aircraft.

In this embodiment, the survey of the profile on the one hand and the lateral visualization on the other hand can be carried out by a conventional radar, which is monopulse in both planes and is capable of assuming all the other functions of an aircraft radar.

In the diagram of FIG. 21 for example, which illustrates the displacement of the antenna or aerial, the portion of the sweep between the points 300 and 301 corresponds to the line-of-sight scanning for surveying the contours; the other sweep portions 201, 202, 302, 304, 305 to 300 may be used for purposes other than surveying the contours as defined above.

The second part of the program, relating to the preparation of the pilotage instructions, is effected by means of a digital computer which, also, may be capable of other calculations useful for the navigation, bombing, etc.

*Survey of the contours of the ground and storage thereof*

In its initial position, the antenna of the radar emits a beam along an elevated line of sight (for example of the order of 30° above the horizontal) and this beam is displaced downwards at maximum speed. During this phase, a distance D of the order of 15 km., which is the range of the radar, is defined along the axis of the beam by means of a fixed range gate F. A mobile range gate $F_1$ rapidly describes, alternately in one direction and then in the other, the segment bonded by the point of maximum distance D and a point of minimum distance $d$ of the order of 600 m. (Naturally, the information of a numerical nature is only given by way of example and has no limiting character here.)

The radar beam makes contact with the ground, which results either in the appearance of an echo in the gate $F_1$ or in the appearance of an echo in the gate F. The survey of the contours then begins.

If the echo appears in the gate $F_1$ the line-of-sight sweep of the antenna beam in a vertical plane is stopped and the gate F is made to approach the gate $F_1$ at a constant velocity, the maximum distance thus decreasing linearly with time. When the gate F reaches the obstacle detected by the gate $F_1$, the approach movement of the gate F continues under the same conditions and the antenna beam is vertically deflected to maintain the gate F in contact with the ground.

This case corresponds to the presence of a rise situated, in relation to the aircraft, at a distance less than the range of the radar.

If the initial echo appears directly in the gate F, the process of controlling the beam direction of the aerial or antenna to maintain the gate F in contact with the ground begins immediately. In either case (initial detection by the gate $F_1$ or by the gate F) the gate $F_1$ still continues its rapid scanning between the minimum distance $d$ and the position of F.

If no other obstacle is detected by the gate $F_1$, the vertical movement of the beam position is stopped at 15° or 20° below the velocity vector of the aircraft.

If another obstacle is detected by the gate $F_1$ (which corresponds to the presence of another rise), the swing of the beam position is again stopped and is resumed in order to maintain the gate F in contact with the ground, at the moment when the gate F reaches said obstacle.

In the example illustrated in FIG. 22, if the starting position of the aerial corresponds to the beam $AF_0$, $F_0$ indicating the position of the gate F along this beam, the beam in the course of a downward swing encounters the obstacle S and the swing is stopped. The gate F is then displaced along the beam at a constant velocity, in a direction approaching the craft A, until it registers with the obstacle S. The swing of the beam is then resumed, being controlled in such a manner that the gate F follows the contour SR. In the position AR of the beam, another obstacle, i.e. obstacle Q nearer than S, is detected by the gate $F_1$. The beam is again stopped in its vertical swing and the gate F is displaced along line A–R until it registers with point Q. The beam swing is then resumed once more, under the control of the gate $F_1$, in such manner that the gate F follows the profile Q–P, AP corresponding to the limiting position of the beam of the radar with maximum negative deflection.

The profile surveyed by the radar therefore comprises, in this case, a portion PQ which is an actual contour, a rectilinear portion QR which is an interpolation, a portion RS which is again an actual contour, and a portion $SF_0'F_0$ which is an extrapolation.

From the moment when the gate F begins to wander and up to the moment when the downward deflection of the beam is finally stopped (the first moment corresponding in the above example to the position AS of the beam, the latter moment corresponding to the position AP), the apparatus continuously calculates the two functions of time:

$$\rho \cos \theta$$

and $$\rho \sin \theta$$

with $$\rho = AF$$

$\theta$ being the angle of AF in relation to the horizontal. $\rho \cos \theta$ is necessarily a decreasing function of time.

This function is continuously compared with the decreasing arithmetical progression:

$$X_n, X_{n-1}, X_{n-2} \ldots$$

in which:

$$X_n = 15,000 \text{ m.}$$

and $$X_i - X_{i-1} = 100 \text{ m.}$$

(Here again, of course, these numerical data are not of a limiting nature. $X_n$ is selected equal to 15,000 m. when the range D of the radar is equal to this value and $X_i - X_{i-1}$ is equal to 100 m. for a reason which will be apparent later.)

The invention provides for the values of $\rho \cos \theta$ to be compared with the sequence $X_n, X_{n-1}, \ldots$ either in accordance with a preferred analogue method if the equivalent of the sequence $X_n, X_{n-1}$ is available in this form, or by a digital method, which necessitates the coding of $\rho \cos \theta$.

Every time $\rho \cos \theta$ passes through the value of one of the terms of the above arithmetical progression, for example $X_k$, the corresponding value of $\rho \sin \theta$ is noted and it is this value which, quantified or coded, is introduced into a digital computer after having been increased by $h$ (absolute altitude of the aircraft) each time, to obtain;

$$Z_k = \rho \sin \theta + h$$

The values of $Z_k$ are stored in a semi-permanent register and the values of $X_k$ are stored in a permanent register.

If the survey of the contours takes place in a sufficiently short time, in practice of the order of 0.5 second or less, the error introduced by the displacement of the aircraft is sufficiently small so as not to intervene in a disturbing manner in the final result.

*Calculation of the instruction de/dt*

If the moment $t=0$ designates the end of the phase defined above during which the survey of the contours of the ground has been effected and the result has been stored, and if $A_0$ is the corresponding position of the aircraft, the coordinate points $X_i$, $Z_i$ are defined in the aforedescribed system of fixed coordinates $X_1$, $O_1$, $Z_1$ shown in FIG. 23, the origin $O_1$ being at an absolute altitude of zero, $X_1$ being horizontal and $Z_1$ being the ascending vertical passing through $A_0$.

The guard curve C is supplied in a system of movable coordinates X, O, Z whose position, at the moment $t=0$, in relation to the fixed system $X_1$, $O_1$, $Z_1$ is defined as follows:

In the case where $\eta_0 \geq 0$, that is to say when the orientation of the velocity vector of the aircraft $A_0$ is positive or zero, the origin O has as its coordinates:

$$X_0 = 0$$
$$Z_0 = h - h_0$$

In the case where $\eta_0 < 0$, that is to say when the angle of the velocity vector at $A_0$ in relation to the horizontal is negative, the coordinates of the origin O are:

$$X_0 = R_c \sin \eta_0 \approx -R_c \eta$$

and $$Z_0 = h - h_0 - R_c(1 - \cos \eta_0) \approx h - h_0 - R_c \eta_0^2/2$$

The axes OX and $O_1 X_1$ are parallel and extend in the same direction. The axes OZ and $O_1 Z_1$ are likewise parallel and codirectional. Pursuant to a feature of our invention, particularly applicable to this embodiment, we plot a parabola satisfying an equation:

$$Z = X^2/2R$$

to be selected as a guard curve.

Such a parabola differs very little from the guard circle (i.e. its osculatory circle of radius R) utilized in the previous embodiment. Its equation is simpler than that of the circle, which simplifies the construction of the computer, in view of the particularly simple formulas for the slope of the tangent and the slope of the normal at any point in the parabola. As is true of the guard circle, the parabola has a horizontal tangent at a point (O in FIG. 23) which is the nadir of a circle of radius $R_c$ passing through the position $(A_0)$ of the aircraft; at this point, furthermore, the parabola has a minimum radius of curvature equal to R.

The value of R is determined, in a manner similar to that which was described in the previous embodiment by:

$$R = R_p + R_c = v_0^2 \left( \frac{1}{qn_p} + \frac{1}{qn_c} \right)$$

$v_0$ being the modulus of the velocity vector at $A_0$ and the values $h_0$, $qn_p$, $qn_c$ being introduced into the computer by direct selection, as indicated above. The value of $h$ is known at every moment through the navigation calculation.

If the aircraft is assumed to be motionless at $A_0$ during an interval time $\Delta t$, the reference systems $X_1$, $O_1$, $Z_1$ (fixed) and X, O, Z (movable) occupy the relative positions indicated in FIG. 23. A point on the ground with the abscisso $X_i$ in the fixed system has:

$$X'_i = X_i - X_0$$

as an abscissa in the movable system.

The ordinate of the corresponding point on the guard parabola is:

$$Z'_i = \frac{X_i'^2}{2R}$$

which, in the fixed system, becomes:

$$Z''_i = \frac{X_i'^2}{2R} + Z_0$$

Since the ordinate of the point on the ground is $Z_i$, the spacing is the difference:

$$Z_i - Z''_i = e_i$$

This mode of procedure is simpler than and substantially equivalent to that which consists, in the embodiment previously described, in taking the spacing along the normal to the curve. It is interesting to note, however, that the measuring of distance along a radius OP, as in FIG. 7, or along a vertical line parallel to the parabola axis, as in FIG. 23, proceeds in each case in the direction of the geometric center of the respective conic, this center being infinitely remote from vertex O in the case of the parabola.

The slope of the tangent is given by $$dZ'_i / dX'_i$$

It is therefore equal to $$X'_i / R$$

and substantially equal to the angle $\delta_i$ between the tangent to the parabola and the horizontal at the coordinate point $X'_i, Z'_i$.

The derivative of the separation is then:

$$de_i/dt = v_0 \sin(\delta_i - o) \approx o(\delta_i - \eta_0)$$

The instruction given to the aircraft in relation to the point on the ground with the coordinate $X_i$, $Z_i$ is then:

$$d_i \frac{(d\eta)i}{dt} = \frac{0.1}{V_0} \left( e_i + 5 \frac{de_i}{dt} \right)$$

by application of a formula identical with Equation 1 used for the previous embodiment but with insertion of specific values for the parameters G and T thereof by way of example.

The calculation detailed above comprises:

3 subtractions
2 additions
7 multiplications (assuming a prior calculation of $$\frac{1}{2R}, \frac{1}{R} \text{ and } \frac{0.1}{V_0})$$

The invention provides for this calculation to be carried out in the increasing order of the $X_i$'s, starting from $X_5$, the abscissa of a point 500 m. ahead of the aircraft, and for about 7 points in a time of the order of $\frac{1}{20}$ of a second (value of $\Delta t$), i.e. through point $X_{11}$ (1100 m.)

Then allowance is made for the displacement of the aircraft, which during the interval $\Delta t$, has as its components:

$$\Delta X_A = v_0 \Delta t \cos \eta_0 \approx v_0 \Delta t$$
$$\Delta Z_A = v_0 \Delta t \sin \eta_0 \approx v_0 \Delta t$$

These results are stored and used later.

The new coordinates of the origin O of the system of movable coordinates are:

In the case where $\eta$ is positive or zero:

$$X_0 = \Delta X_A$$
$$Z_0 = h - h_0 + \Delta Z_A$$

In the case where $\eta$ is negative:

$$X_0 = -R_c \eta + \Delta X_A$$
$$Z_0 = h - h_0 - R_c \frac{\eta^2}{2} + Z_A$$

$\eta$ being the new angle of the velocity vector, the modulus being assumed to be unchanged.

The calculation of the instructions is then resumed with the new values from $X_0$, $Z_0$ and $\eta$, of $X_{12}$ to determined, and so on.

Then the new displacement of the aircraft is determined, and so on.

When the calculation has been carried out for the last value $X_{150}$ (corresponding to the distance of 15 km. which is the maximum practical range of the radar), the variable $d\eta_i/dt$ has the highest value of those which have been calculated as indicated.

The calculation of $R_c$ and R is then resumed with the new value $v$ instead of $v_0$. Then $$\frac{1}{2R}, \frac{1}{R} \text{ and } \frac{0.1}{v}$$

are calculated, whereupon the process detailed above is resumed to obtain the subsequent instruction.

After four repetitions, a fresh survey of the contours of the ground to be flown over is effected, and so forth.

*Computer*

The general program of the low-altitude flight can thus be subdivided (see FIG. 24) into $(n+1)$ sub-routines, namely one sub-routine $P_0$ and $n$ identical subroutines $P_1$.

The program $P_0$, the execution time of which is indeterminate consists in effecting the selections ($q_{nc}$, $q_{np}$, $h_0$) and tests; it involves the actual execution, including inter alia the starting of the antenna movement.

A program $P_1$, the execution period of which is 4.5 seconds, is subdivided into five subroutines, namely a subroutine $P_{11}$ and four identical subroutines $P_{12}$.

A program $P_{11}$ (execution time 0.5 seconds) comprises the survey of the contours of the ground and its storing in the form of a table of coordinates ($X_i$, $Z_i$) for the values of $i=n, n-1, \ldots 7, 6, 6$; with:

$$Z_i = \rho \sin \theta + h$$
$$\theta = \cos^{-1} X_i/\rho$$

This program also supplies the clock pulses and controls all the following calculations (delivery of the ($X_i$, $Z_i$)'s in the order $i=5, 6, \ldots n-2, n-1, n, 5, 6, \ldots$).

A program $P_{12}$ (execution time: 1 second) is subdivided into 21 subroutines, namely: one subroutine $P_{121}$ and twenty identical subroutines $P_{122}$.

A subroutine $P_{121}$, the execution time of which is $\frac{1}{60}$ of a second, consists in calculating:

$$R_c, R_p, R, \frac{1}{2R}, \frac{1}{R}, \frac{0.1}{v}$$

A program $P_{122}$ (execution time $\frac{1}{20}$ of a second) is subdivided into 8 subroutines, namely: one sub-routine $P_{1221}$ and seven subroutines $P_{1222}$, these latter all being identical.

A program $P_{1221}$ (execution time $\frac{1}{60}$ of a second) consists in calculating $\Delta Z_A$, $\Delta Z_A$, $X_0$ and $Z_0$.

A program $P_{1222}$ (execution time $\frac{1}{60}$ of a second) consists in calculating:

$$X_i = {}_i - X_0$$
$$Z_i = 1/2 X R_i^2$$
$$Z_i'' = Z_i - Z_0$$
$$e_i = Z_i - Z_i''$$

$$\frac{dZ_i'}{dX_i'} = \frac{X_i'}{R} = \alpha_i$$

$$\frac{de_i}{dt} = v(\delta_i - \eta)$$

$$\frac{d\eta_i}{dt} = \frac{0.1}{v}\left(\delta_i + 5\frac{de_i}{dt}\right)$$

FIG. 24 shows diagrammatically the subdivision of the various programs, their number and their respective execution times.

The carrying out of a program $P_{1222}$ comprises the execution of:

3 substractions
2 additions
7 multiplications.

If the logic unit of position is 20 m., the numbers handled will comprise at most 10 digits; since one multiplication is equivalent to 9 additions, there are a total of 68 additions to be carried out in $\frac{1}{100}$ of a second which justifies the use of a computer of the parallel type.

The carrying out of a program $P_{1221}$ comprises the execution of a comparison to determine whether $\eta$ is greater or smaller than 0 and:

In the case where $\eta$ is smaller than 0, the execution of:

7 additions
6 multiplications
1 division (by 2).

In the case where $\eta$ is greater than 0, the execution of:

5 additions
3 multiplications.

The carrying out of a program $P_{121}$ comprises the execution of:

3 multiplications
1 addition
5 divisions.

The carrying out of a program $P_{11}$ comprises the execution of:

150 comparisons (analogue)
150 codings ($Z_i$)
150 additions.

The flight paths obtained by the process defined are comparable with those obtained by the previous embodiment.

The continuity between the instructions is particularly satisfactory in this embodiment in view of the fact that the whole profile of the terrain ahead is taken into consideration and not just a few very restricted portions thereof.

We claim:

1. An airborne pilotage system for low-flying aircraft, comprising aboard a craft of variable pitch angle equipped with said system:

radar transmitting and receiving means for scanning the space below and ahead of the craft along an arcuate guard curve lying in a vertical plane between said craft and the ground with a concave side facing the craft and with a predetermined orientation relative thereto;

computer means connected to said receiving means for calculating the magnitude and sign of the distance of terrain formations, detected in the vicinity of said guard curve, from said curve in radial direction of the latter;

and altitude-control means for said craft responsive to the output of said computer means for maintaining said guard curve in a skimming position with reference to said terrain formations whereby the craft will clear said formations at a relative altitude determined by the orientation of said guard curve, said altitude-control means including means for varying said pitch angle with reference to the horizontal to an extent determined by the magnitude of said distance and in a sense depending upon the sign of said distance.

2. An airborne pilotage system for low-flying aircraft, comprising aboard a craft of variable pitch angle equipped with said system:

radar transmitting and receiving means for scanning the space below and ahead of the craft along an arcuate guard curve lying in a vertical plane between said craft and the ground with a concave side facing the craft and with a predetermined orientation relative thereto;

computer means connected to said receiving means for calculating the magnitude and sign of a distance $e$ of terrain formations, detected in the vicinity of said guard curve, from said curve in radial direction of the latter, and for further calculating the differential $de/dt$ of said distance with respect to time;

and altitude-control means for said craft responsive to the output of said computer means for maintaining said guard curve in a skimming position with reference to said terrain formations whereby the craft will clear said formations at a relative altitude determined by the orientation of said guard curve, said altitude-control means including means for varying said pitch angle with reference to the horizontal to an extent determined by the magnitudes of $e$ and $de/dt$ and in a sense depending upon the sign of $e$.

3. A system as defined in claim 2 wherein said radar transmitting and receiving means includes antenna means for producing a beam of electromagnetic radiation directed generally forwardly of said craft, sweep means for displacing said beam and range-gate means for tracing said guard curve between a proximal and a distal operating limit of said antenna means.

4. A system as defined in claim 3 wherein said sweep means includes means for displacing said beam in said vertical plane during a fraction of an operating cycle and for displacing said beam in a different plane during the remainder of said operating cycle.

5. A system as defined in claim 3 wherein said radar transmitting and receiving means further includes means for coordinating the operations of said sweep means and range-gate means in tracing at least part of the profile of the terrain ahead of said craft during an operating cycle.

6. A system as defined in claim 5 wherein said sweep means is operable to impart progressive downward deflection to said beam, said range-gate means including first gate means establishing said distal limit and second gate means for scanning the space between said limits in a direction approaching said proximal limit concurrently with said downward deflection, said second gate means being operable upon detection of an obstacle in said space to arrest the downward deflection of said beam by said sweep means and to bring said proximal limit along the arrested beam into registry with said obstacle, said sweep means being thereupon operable to resume the downward deflection of said beam.

7. A system as defined in claim 5 wherein said computer means includes means for measuring successive values of a function of $e$ and $de/dt$ in the course of said operating cycle and for storing the maximum value of said function to the end of the cycle, said altitude-control means being responsive to said maximum value.

8. A system as defined in claim 5 wherein said computer means includes means for measuring successive values of the derivative with respect to time of the angle of elevation $\eta$ included between the velocity vector of the craft and the horizontal, said derivative having the formula $$d\eta/dt = G(e + T \cdot de/dt)$$

where G and T are constants, in the course of said operating cycle and for storing the maximum value of said function to the end of the cycle, said altitude-control means being responsive to said maximum value.

9. An airborne pilotage system for low-flying aircraft, comprising aboard a craft of variable pitch angle equipped with said system:

radar transmitting and receiving means for scanning the space below and ahead of the craft along a divergent zone centered on an arcuate guard curve lying in a vertical plane between said craft and the ground with a concave side facing the craft and with a predetermined orientation relative thereto;

computer means connected to said receiving means for calculating the magnitude and sign of the distance of terrain formations, detected in said zone, from said curve in radial direction of the latter;

and altitude-control means for said craft responsive to the output of said computer means for maintaining said guard curve in a skimming position with reference to said terrain formations whereby the craft will clear said formations at a relative altitude determined by the orientation of said guard curve, said altitude-control means including means for varying said pitch angle with reference to the horizontal to an extent determined by the magnitude of said distance and in a sense depending upon the sign of said distance as determined by the appearance of a terrain formation within said zone on a respective side of said curve.

10. An airborne pilotage system for low-flying aircraft, comprising aboard a craft of variable pitch angle equipped with said system:

radar transmitting and receiving means for scanning the space below and ahead of the craft along a divergent zone centered on an arcuate guard curve lying in a vertical plane between said craft and the ground with a concave side facing the craft and with a predetermined orientation relative thereto;

computer means connected to said receiving means for calculating the magnitude and sign of the distance $e$ of terrain formations, detected in said zone, from said curve in radial direction of the latter, and for further calculating the differential $de/dt$ of said distance with respect to time;

and altitude-control means for said craft responsive to the output of said computer means for maintaining said guard curve in a skimming position with reference to said terrain formations whereby the craft will clear said formations at a relative altitude determined by the orientation of said guard curve, said altitude-control means including means for varying said pitch angle with reference to the horizontal to an extent determined by the magnitudes of $e$ and $de/dt$ and in a sense depending upon the sign of $e$ as determined by the appearance of a terrain formation within said zone on a respective side of said curve.

11. An airborne pilotage system for low-flying aircraft, comprising aboard a craft of variable pitch angle equipped with said system, said craft having a predetermined minimum pitch-up radius $R_c$ and a minimum pitch-down radius $R_p$:

radar transmitting and receiving means for scanning the space below and ahead of the craft along an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve having a radius of curvature at said point substantially equal to the sum of $R_c$ and $R_p$;

computer means connected to said receiving means for calculating the magnitude and sign of the distance of terrain formations, detected in the vicinity of said guard curve, from said curve in radial direction of the latter;

and autopilot means responsive to the output of said computer means for varying said pitch angle with reference to the horizontal to an extent determined by the magnitude of said distance and in a sense depending upon the sign of said distance with maintenance of said curve in a skimming position with reference to said terrain formations whereby the craft will clear said formations at a relative altitude corresponding to the vertical separation of said point from said nadir.

12. An airborne pilotage system for low-flying aircraft, comprising aboard a craft of variable pitch angle equipped with said system, said craft having a predetermined minimum pitch-up radius $R_c$ and a minimum pitch-down radius $R_p$:

radar transmitting and receiving means for scanning the space below and ahead of the craft along a divergent zone centered on an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve being a conic section with a radius of curvature at said point substantially equal to the sum of $R_c$ and $R_p$;

computer means connected to said receiving means for calculating the magnitude and sign of the distance of terrain formations, detected in said zone, from said curve in the direction of a line passing through the geometric center of said conic section;

and autopilot means responsive to the output of said computer means for varying said pitch angle with reference to the horizontal to an extent determined by the magnitude of said distance and in a sense depending upon the sign of said distance, as determined by the appearanace of a terrain formation within said zone on a respective side of said curve, with maintenance of said curve in a skimming position with reference to said terrain formations whereby the craft will clear said formations at a relative altitude corresponding to the vertical separation of said point from said nadir.

13. An airborne pilotage system for low-flying aircraft, comprising aboard a craft a variable pitch angle equipped with said system, said craft having a predetermined minimum pitch-up radius $R_c$ and a minimum pitch-down radius $R_p$:

radar transmitting and receiving means for scanning the space below and ahead of the craft along an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve having a radius of curvature at said point substantially equal to the sum of $R_c$ and $R_p$;

computer means connected to said receiving means for calculating the magnitude and sign of the distance $e$ of terrain formations, detected in the vicinity of said guard curve, from said curve in generally radial direction of the latter and for further calculating the differential $de/dt$ of said distance with respect to time;

and autopilot means responsive to the output of said computer means for varying said pitch angle with reference to the horizontal to an extent determined by the magnitudes of $e$ and $de/dt$ and in a sense depending upon the sign of $e$ with maintenance of said curve in a skimming position with reference to said terrain formations whereby the craft will clear said formations at a relative altitude corresponding to the vertical separation of said point from said nadir.

14. An airborne pilotage system for low-flying aircraft, comprising aboard a craft of variable pitch angle equipped with said system, said craft having a predetermined minimum pitch-up radius $R_c$ and a minimum pitch-down radius $R_p$:

radar transmitting and receiving means for scanning the space below and ahead of the craft along a divergent zone centered on an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve having a radius of curvature at said point substantially equal to the sum of $R_c$ and $R_p$;

computer means connected to said receiving means for calculating the magnitude and sign of the distance $e$ of terrain formations, detected in said zone, from said curve in radial direction of the latter and for further calculating the differential $de/dt$ of said distance with respect to time;

and autopilot means responsive to the output of said computer means for varying said pitch angle with reference to the horizontal to an extent determined by the magnitudes of $e$ and $de/dt$ and in a sense depending upon the sign of $e$, as determined by the appearance of a terrain formation within said zone on a respective side of said curve, with maintenance of said curve in a skimming position with reference to said terrain formations whereby the craft will clear said formations at a relative altitude corresponding to the vertical separation of said point from said nadir.

15. An airborne pilotage system for low-flying aircraft, comprising aboard a craft of variable pitch angle equipped with said system, said craft having a predetermined minimum pitch-up radius $R_c$ and a minimum pitch-down radius $R_p$:

radar transmitting and receiving means for scanning the space below and ahead of the craft along an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve being a conic section with a radius curvature at said point substantially equal to the sum of $R_c$ and $R_p$;

computer means connected to said receiving means for calculating the magnitude and sign of the distance of terrain formations, detected in the vicinity of said guard curve, from said curve in the direction of a line passing through the geometric center of said conic section;

and autopilot means responsive to the output of said computer means for varying said pitch angle with reference to the horizontal to an extent determined by the magnitude of said distance and in a sense depending upon the sign of said distance with maintenance of said curve in a skimming position with reference to said terrain formations whereby the craft will clear said formations at a relative altitude corresponding to the vertical separation of said point from said nadir.

16. An airborne pilotage system for low-flying aircraft, comprising aboard a craft of variable pitch angle equipped with said system, said craft having a predetermined minimum pitch-up radius $R_c$ and a minimum pitch-down radius $R_p$:

radar transmitting and receiving means for scanning the space below and ahead of the craft along an arcuate guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve being a parabola with a vertical axis passing through said nadir, and having a radius of curvature at said point substantially equal to the sum of $R_c$ and $R_p$;

computer means connected to said receiving means for calculating the magnitude and sign of the vertical distance of terrain formations, detected in the vicinity of said guard curve, from said curve;

and autopilot means responsive to the output of said computer means for varying said pitch angle with reference to the horizontal to an extent determined by the magnitude of said distance and in a sense depending upon the sign of said distance with maintenance of said curve in a skimming position with reference to said terrain formations whereby the craft will clear said formations at a relative altitude corresponding to the vertical separation of said point from said nadir.

17. An airborne pilotage system for low-flying aircraft, comprising aboard a craft of variable pitch angle equipped with said system, said craft having a predetermined minimum pitch-up radius $R_c$ and a minimum pitch-down radius $R_p$.

radar transmitting and receiving means for scanning the space below and ahead of the craft along a circular guard curve lying in a vertical plane between said craft and the ground with a concave side facing the craft, said curve being of invariable shape and passing with a horizontal tangent through a point directly below the nadir of a circle of a radius substantially equal to $R_c$ located in said vertical plane, said craft being located on said circle and having a velocity vector tangent thereto, said curve having a radius of curvature substantially equal to the sum of $R_c$ and $R_p$;

computer means connected to said receiving means for calculating the magnitude and sign of the distance of terrain formations, detected in the vicinity of said guard curve, from said curve in radial direction of the latter;

and autopilot means responsive to the output of said computer means for varying said pitch angle with reference to the horizontal to an extent determined by the magnitude of said distance and in a sense depending upon the sign of said distance with maintenance of said curve in a skimming position with reference to said terrain formations whereby the craft will clear said formations at a relative altitude corresponding to the vertical separation of said point from said nadir.

References Cited by the Examiner

UNITED STATES PATENTS

| | | | |
|---|---|---|---|
| 2,630,283 | 3/1953 | Hanson | 343—7 X |
| 2,965,894 | 12/1960 | Sweeney | 343—7 |
| 3,119,582 | 1/1964 | Kaufman | 343—7 X |

CHESTER L. JUSTUS, *Primary Examiner.*

T. H. TUBBESING, *Assistant Examiner.*